Sept. 2, 1969  R. B. LIGHTFOOT  3,464,651
ROTOR LOAD PROPORTIONER FOR A COMPOUND HELICOPTER
Filed May 2, 1967  3 Sheets-Sheet 1
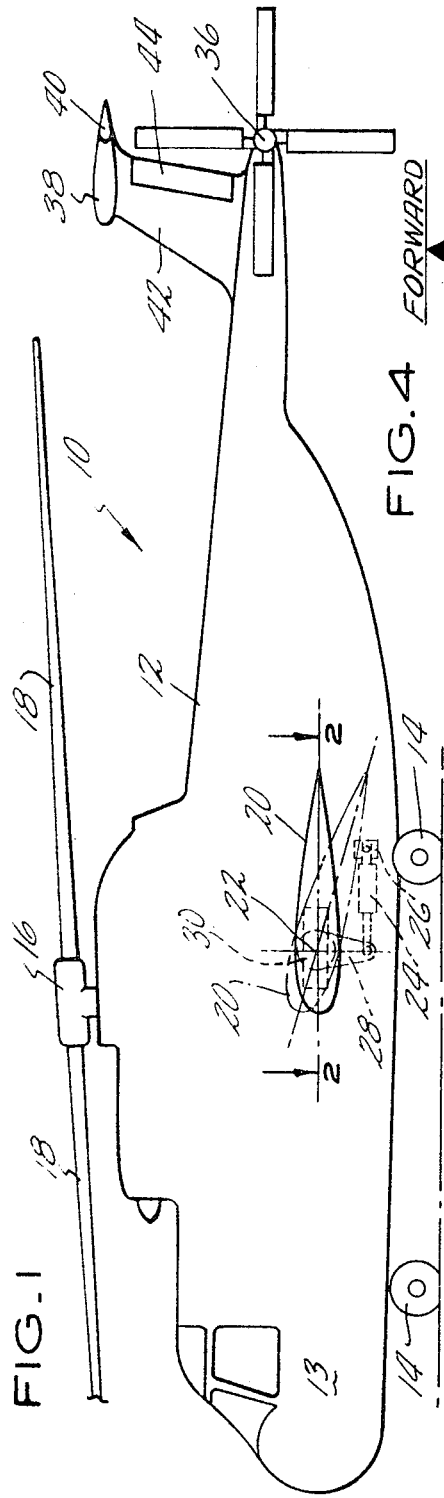
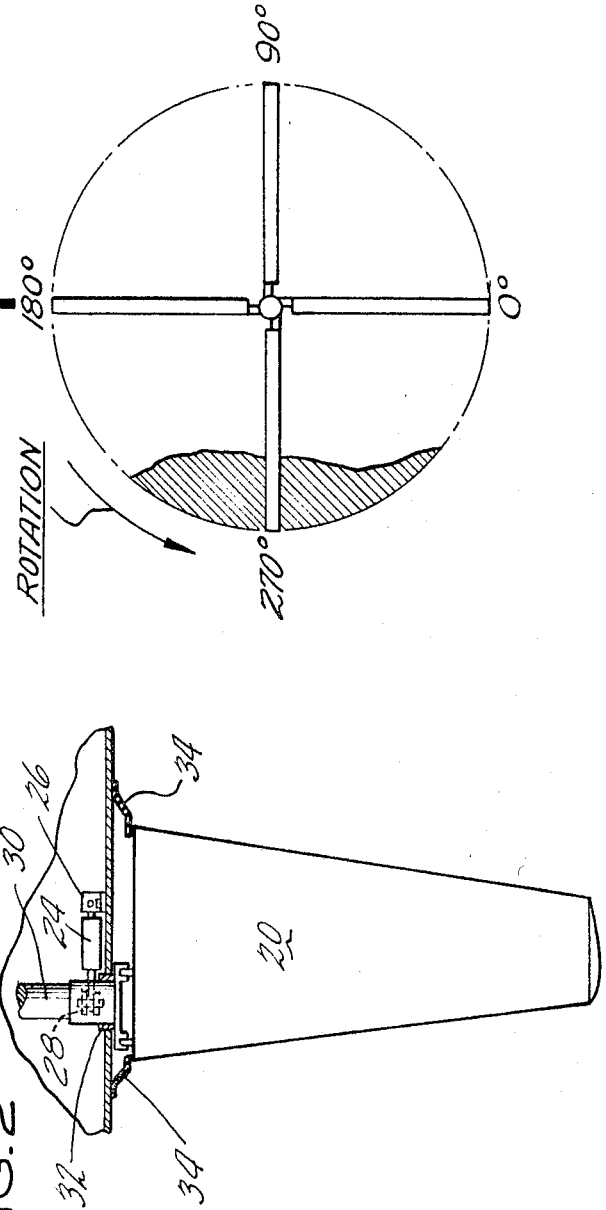
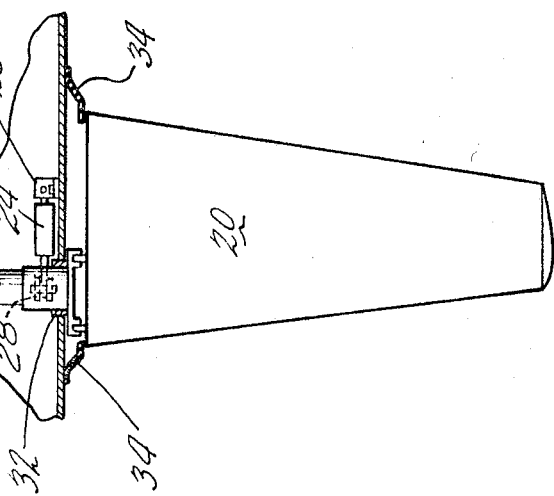
INVENTOR
RALPH B. LIGHTFOOT
BY Vernon F. Hauschild
ATTORNEY Sept. 2, 1969      R. B. LIGHTFOOT      3,464,651
ROTOR LOAD PROPORTIONER FOR A COMPOUND HELICOPTER
Filed May 2, 1967      3 Sheets-Sheet 2
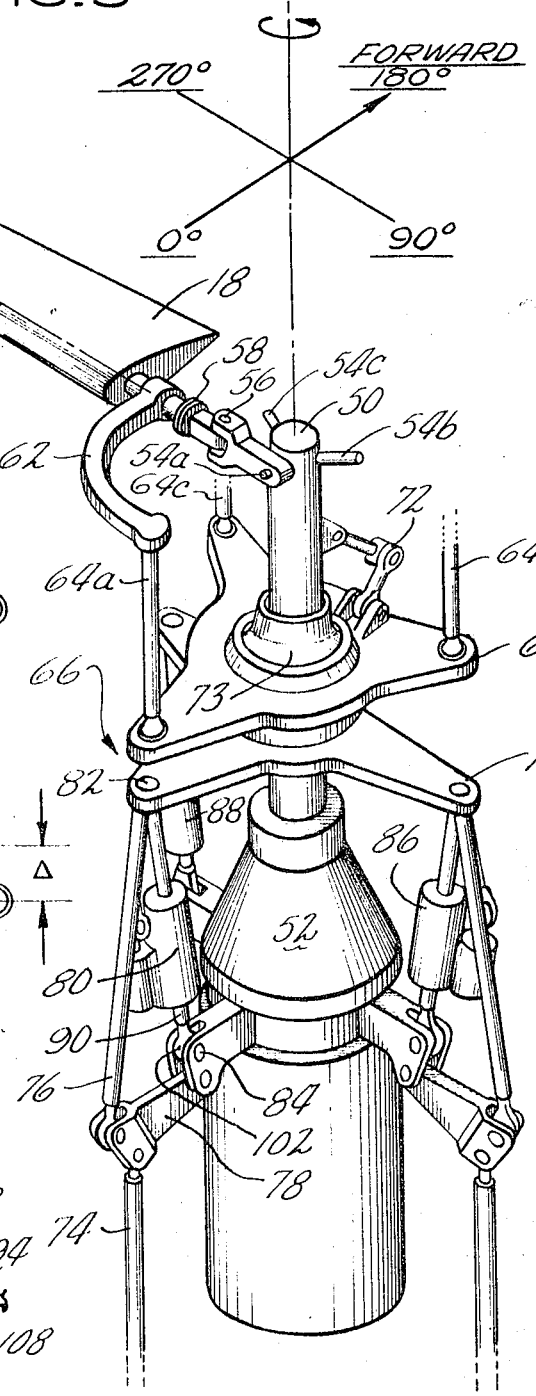
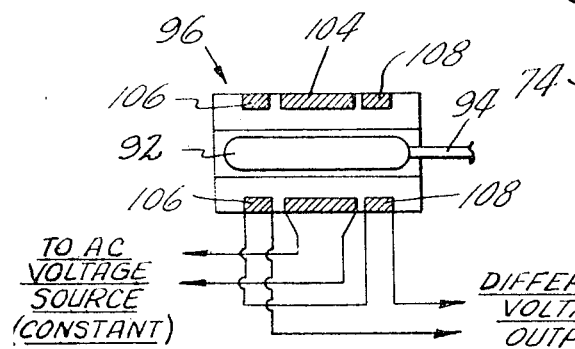
INVENTOR
RALPH B. LIGHTFOOT
BY Vernon F. Hauschild
ATTORNEY

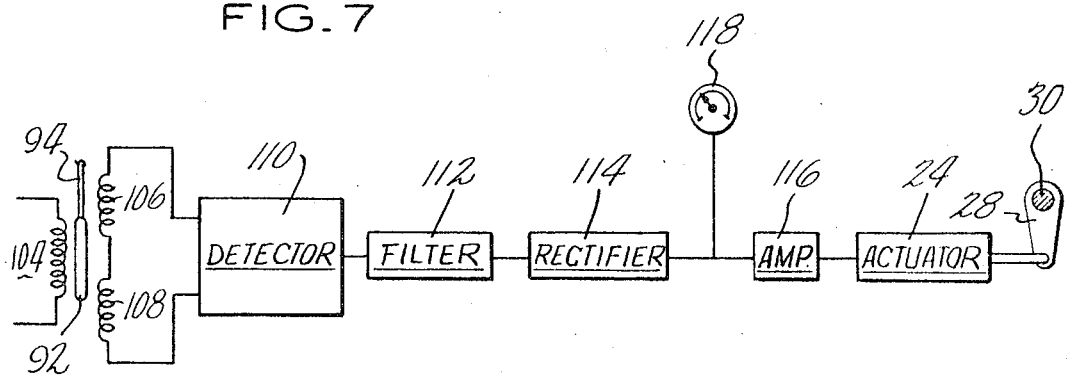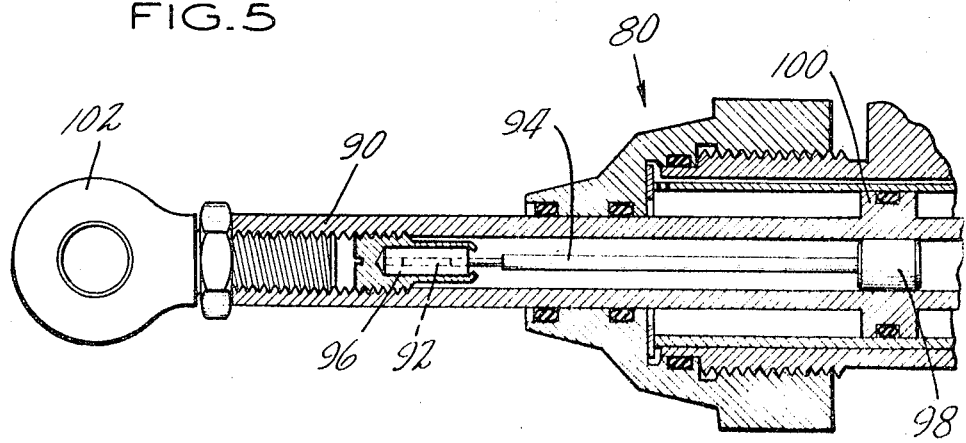

United States Patent Office 3,464,651
Patented Sept. 2, 1969

3,464,651
ROTOR LOAD PROPORTIONER FOR A COMPOUND HELICOPTER
Ralph B. Lightfoot, Stratford, Conn., assignor to United Aircraft Corporation, East Hartford, Conn., a corporation of Delaware
Filed May 2, 1967, Ser. No. 635,411
Int. Cl. B64c 11/06, 11/40
U.S. Cl. 244—17.13                15 Claims

ABSTRACT OF THE DISCLOSURE

This invention relates to a control system for proportioning the total thrust of an aircraft between a sustaining rotor and a second lift-producing device such as a fixed wing or a thrust-producing device. The augmentation provided by the second device is varied as a function of a stall condition detected at the rotor. By transferring a portion of the load between the rotor and the second device, stall conditions are avoided and the rotor can operate efficiently at its designed performance level.

Background of the invention

Many efforts have been directed toward increasing the top speed of the conventional helicopter. Combining the vertical takeoff and hovering capabilities with high speed performance in one aircraft is naturally desirable but not without problems.

Competing demands on a rotor design for both hovering and high speed flight run into conflict. One of the major considerations is blade stall. Among other factors such as high temperature and high altitude, blade stall on the retreating blades is aggravated by high speed, high gross weight, high load factor, and low rotor speed. On the other hand, consideration must also be given to critical Mach number effects on the advancing blades. Mach number effects are aggravated by high speed, high gross weight, high load factor and high rotor speed.

If the rotor could be relieved of its load caused in part by the high gross weight and load factor, a compromise could be reached on the rotor speed conflict to permit an increase in top speed of the helicopter.

Summary of the invention

The rotor load of a helicopter can be reduced in a number of ways. By considering the thrust vector of the sustaining rotor to have horizontal and vertical components, one solution to the unloading problem is suggested. Each of the components can individually be reduced. The horizontal component which generally contributes the propulsive force can be reduced by providing auxiliary propulsion means such as a thrust engine or a pusher propeller as disclosed in U.S. Patent No. 2,959,373. The vertical component can be reduced by providing a second lift-producing device.

This invention relates primarily to reducing the thrust load of the rotor with a second lift-producing device, for example a fixed wing, to achieve higher speed or higher maneuvering performance, both of which would otherwise be limited by gross weight and load factor. The invention contemplates that a load proportioner be incorporated with any lift-producing device or thrust-producing device, or combination of the two to relieve the vertical or horizontal component of the main rotor thrust.

In one particular aspect of the invention, the vertical thrust component of the rotor is relieved as a function of the aerodynamic performance of the rotor blades. The loads on the rotor blades provide a convenient parameter for measuring the deterioration in performance and for controlling a second lift-producing device.

In the preferred embodiment of the invention, load transducers are located in the control linkage leading to the main rotor. The loads acting on the rotor blades when a stall condition exists cause the load in the control linkage to be peculiarly different from loads generated when there is no stall. The transducers monitoring this load are used to vary the lift characteristic of a wing on the aircraft. Lift created by the wing is increased during maneuvers or high speed flight as a function of the degree of stall on the blades.

Brief description of the drawings

FIG. 1 is a view of an aircraft in which the invention is incorporated.

FIG. 2 is a sectional view taken along the lines 2—2 of FIG. 1.

FIG. 3 illustrates an elementary helicopter rotor control system.

FIG. 4 is a diagram showing a top view of a helicopter rotor in forward flight.

FIG. 5 is a sectional view of a servoactuator containing a load transducer.

FIG. 6 is a sectional view of a linear variable differential transformer.

FIG. 7 illustrates an electrical circuit which detects a vibratory signal from a transducer and which drives an actuator to operate a rotor load augmenting device.

FIG. 8 is a view of the rotor blade tip looking inboard and showing the geometry of and aerodynamic loads at the blade tip when there is no stall.

FIG. 9 is a view of the rotor blade tip looking inboard and showing the geometry of and aerodynamic loads at the blade tip during stall conditions.

Description of preferred embodiment

In FIG. 1, the aircraft 10 has a fuselage 12, a pilot's cockpit 13, tricycle landing gear 14, a conventional helicopter rotor 16 with variable pitch blades 18. Projecting laterally from each side of the fuselage are fixed wings 20 (only the left wing is visible). At this point, it should be mentioned that the term "fixed wing" as it appears throughout this specification is used as a word of art to distinguish a "fixed wing" from a "rotary wing" such as blades 18 of the rotor 16. The term "fixed wing" does not mean the wing is rigidly fastened to the fuselage but should be broadly interpreted to include a wing which can be moved slightly with respect to the fuselage to change its angle of incidence in forward flight. In particular, the term is to be applied to the wing 20 whose lift can be changed by rotating it about axis 22 by means of an actuator 24. The actuator 24 is fastened at one end to the fuselage 12 by means of a bracket 26 and is pinned at the other end to a pivot arm 28. The pivot arm 28 is rigidly fastened to a transverse torque tube 30 shown in FIG. 2. The torque tube 30 is supported at each wall of the fuselage by bearings 32. The wings 20 are rigidly fastened to the ends of the torque tube 30 so that the angle of incidence of the wings 20 can be changed by the actuator 24. A fairing 34 is interposed between the projecting wings 20 and the fuselage 12 in order to form an aerodynamically clean attachment.

As the angle of the wings 20 is changed by the actuator 24 in forward flight, the angle of attack of the wing will also change. If the angle of attack is increased, the lift of the wing will also increase provided that the stall condition of the wing is not exceeded. Beyond this point, further increases in the pitch of the wing are not desired because the wing would lose lift and add to the overall drag of the aircraft.

Although a movable wing has been shown for augmenting the lift of the motor, such a wing is not the only device which can be used for this purpose. For instance, a wing which is rigidly fastened to the fuselage but which has movable flaps or leading edge slats for changing its lift characteristic could perform the same function. Likewise, any secondary lift-producing or thrust-producing devices which have variable thrust or lift characteristics such as a lifting fan, a thrust engine, or even a second rotor may be used advantageously to relieve the main rotor of a portion of the lifting or propulsive loads.

At the rear of fuselage 12 is anti-torque rotor 36, an elevator 38 having a movable control surface 40 and a rudder 42 having a control surface 44. The main rotor 16 and anti-torque rotor 36 may be used to control the aircraft in roll, pitch and yaw. The elevator 38 and rudder 42 help to control the pitch and yaw of the aircraft in high speed flight as in a conventional aircraft. At low speeds and in hover, the anti-torque rotor 36 opposes the aerodynamic torque applied to the main rotor 16 as in the conventional helicopter. When high speed flight is desired, the anti-torque rotor 36 may be swiveled 90° into a pusher mode to add to the propulsive force moving the aircraft forward. Independent propulsive means such as turbojet engines or conventional propellers may be preferred in a specific design. As mentioned above, these propulsive devices also relieve the rotor loading and may be actuated by my rotor load proportioner. At the same time, rudder control surface 44 will develop sufficient force to oppose the aerodynamic torque of the main rotor 16. An anti-torque rotor of the swiveling type is disclosed in U.S. Patent No. 2,959,373 to which reference may be made for a more detailed explanation of its construction and operation.

In order to fully understand the operation of my rotor load proportioner, the rotor controls of an elementary helicopter rotor shown in FIG. 3 must be understood. Any number of rotor blades 18 can be mounted on the rotor shaft 50 which is driven from a transmission 52. The transmission mounted to the fuselage is in turn driven from the helicopter engines (not shown). In this elementary rotor system, only one of three blades is shown for simplicity. The operation of the other blades during each revolution of the rotor would be the same.

In articulated rotor systems, of which this elementary rotor is an example, the blade 18 is mounted to the rotor shaft 50 by means of a flapping hinge pin 54a and a lead lag hinge pin 56. The other blades would be mounted by pins 54b and 54c. The hinges permit the rotor blade stresses to be relieved in flight. Since the hinges form no part of this invention, and since an articulated rotor is not essential to the invention, no further explanation of the hinges is required.

The blade 18 is mounted on a bearing 58 in order to permit the pitch of the blade to be varied about the blade feathering axis 60. A pitch control horn 62 is rigidly fastened to the inboard end of the blade in order to transmit pitch change motions through the push rod 64a from the swash plate 66. There is one push rod 64 for each of the variable pitch blades 18. The swash plate 66 is composed of a rotating plate 68 and a stationary plate 70. The rotating plate 68 is connected to the rotor shaft 50 through a torque transmitting scissors assembly 72. The scissors assembly 72 causes the plate 68 to rotate with the rotor shaft 50 and keeps the plate 68 indexed with the rotor blades 18. The stationary plate 70 on the other hand is fixed to the transmission 52 by means of a similar scissors assembly (not visible), such that the plate 70 is fixed against rotation with respect to the fuselage. The stationary and rotating plates are coupled together by bearings so that they always remain parallel to one another. The plates 68 and 70 are mounted upon a ball joint 73 which can freely translate up and down on the rotor shaft 50.

The control plane of the swash plate 66 is determined by a control linkage leading from the pilot's cockpit 13 to the stationary plate 70. Part of this control linkage seen in FIG. 3 consists of control rod 74 which operates control rod 76 through bell crank 78. The control rod 76 in turn operates a hydraulic servoactuator 80 which is pivotally connected to both the stationary plate 70 at control point 82 and the transmission at 84. The servoactuator provides hydraulic boost to relive the pilot of large control loads which are inherent in large helicopters. For a more detailed discussion of the construction and operation of this servoactuator, reference may be had to U.S. Patent No. 2,957,527. It will suffice for an understanding of the present invention to recognize that when hydraulic power is on, the displacement of the control rod 76 will result in an identical displacement of the control point 82 through the servoactuator operation. Loads applied between the swash plate and fuselage are supported solely by the servoactuator 80. The operations of servoactuator 86 and servoactuator 88 are controlled in the same manner by rods similar to rods 74 and 76. The servoactuators are not essential to this invention and, therefore, need not be used in small helicopters where the control loads do not necessitate hydraulic boost.

It is a well-known axiom that three points determine a plane and, therefore, it will be readily understood that the three servoactuators 80, 86 and 88 will establish the control plane of the swash plate 66. Tilting the swash plate 66 will cause the blades 18 to vary pitch cyclically as they rotate and translating the swash plate up or down on the rotor shaft will cause the rotor blades 18 to change pitch collectively. Very generally, cyclic pitch causes the thrust vector of the rotor to be tilted for translational movements of the aircraft and collective pitch causes the magnitude of the thrust vector to increase or decrease for weight, g-load, speed and altitude changes.

The three servoactuators 80, 86 and 88 must sustain the combined control loads of all of the push rods 64. With the stationary plate 70 in the particular positions shown in FIG. 3, the servoactuator 80 experiences a large portion of the control load of the shown rotor blade 18 because the servoactuator 80 is positioned directly below push rod 64a. As the push rod 64a rotates past the servoactuator 80, the servoactuator 80 experiences a decrease in the portion of the control load from the shown blade 18 and begins to sense more of the control load from the push rod 64c of the following blade. In flight, the servoactuators experience a load which at any given servoactuator appears to be a steady state load upon which a vibratory load is superimposed due to the rotation of the blades. The frequency of this vibratory load is equal to the cyclic rate at which the blades pass over the servoactuators. This will be called the rotor blade frequency for the purposes of this specification and it will be understood that this frequency is equal to the number of blades multiplied by the rotational speed of the rotor.

Having described the function of this elementary rotor system, the reader will now understand that control loads from the rotating blades are applied to the servoactuators through the push rods 64 and swash plate 66. It is also important to understand generally how the control loads of the rotor are affected by rotor performance. The operation of the rotor in forward flight will be discussed with reference the FIG. 4. As the rotor moves through the air in a forward direction, the relative wind on a rotor blade will vary as a function of the azimuthal position of the blade with respect to the direction of travel. The relative wind on the advancing blades, moving from the downwind or 0° azimuth to the upwind or 180° azimuth, is increased in forward flight because the rotational speed of the blades is added to the translational speed of the rotor with the helicopter. The relative wind on the retreating blades, moving from the upwind or 180° azimuth to the 0° azimuth, is decreased in forward flight because the rotational speed of the blades is subtracted from the translational speed of the rotor. The relative wind is at a maximum on the advancing blade at the 90° azimuth and is at a minimum on the retreating blade at the 270° azimuth. The relative wind on the blades at the 0° and 180° azimuths is not significantly affected in forward flight because the translational speed of the rotor is normal to the blade chord.

The lift on the rotor must be balanced on both the advancing blades and the retreating blades to avoid an undesirable rolling moment. Because of the disparity in the relative winds on each side of the rotor in forward flight, lift within the rotor must be balanced by larger angles of attack on the retreating blades than on the advancing blades. This is accomplished through combinations of pitch change and blade flapping in all rotors whether they are of the articulated or rigid type.

As a result of this necessity for maintaining balanced lift on the rotor, therefore, much larger angles of attack are acquired by the retreating blades especially in the vicinity of the 270° azimuth where the relative wind on the blades is at a minimum. Since blade stall occurs when the rotor is heavily loaded and when the angle of attack high, the normal location at which blade stall begins increased further, due to the pilot's attempt to go faster is near the 270° azimuth at the tip of the blades where the angle of attack is largest due to the high flapping velocity of the flexing blades. If the loads on the rotor are increased burther, due to the pilot's attempt to go faster or to increase the severity of a maneuver, blade stall will begin to work inboard over a larger portion of the rotor disc. The shaded area in the vicinity of the 270° azimuth indicates a typical portion of the rotor disc affected by the retreating blade stall condition.

The resultant aerodynamic force on a symmetric airfoil, which is normally used in variable pitch rotors, operates at an aerodynamic center on the quarter chord when no stall condition exists. In order to reduce the control loads from the blades, the feathering axis is located close to the quarter chord to avoid transmitting a large steady moment into the control linkage due to this resultant force. Balancing rotor blade control loads is discussed in greater detail in my U.S. Patent No. 2,669,313. When stall occurs, however, the resultant force shifts rearward along the blade chord. In addition, when stall occurs at the tip of the retreating blade of a rotor, lift decreases locally, drag increases locally, centrifugal force remains the same, and blade deflection $\Delta$ away from the feathering axis increases.

The effect of these changes will be more clearly understood by reference to FIGS. 3, 8 and 9. When the blades are producing lift, they tend to cone under the centrifugal and lifting forces. When stall occurs locally at the retreating blade tip, the centrifugal load tends to bend the blade downward from its normally coned attitude. This is indicated by the blade tip shown in phantom in FIG. 3. It will be noted that the quarter chord 61 of the phantom blade tip is deflected below the feathering axis 60. This deflection $\Delta$ of the blade is also noted by a comparison of FIGS. 8 and 9 which are views of the blade tip looking inboard during no-stall and stalled conditions respectively. In the no-stall condition of FIG. 8 there is a large lifting force $L_1$, a small drag force $D_1$, and a small rearward moment $M_1$. For the purposes of explanation, the feathering axis 60, the quarter chord 61 and the aerodynamic center where the forces $L_1$ and $D_1$ operate, are shown substantially concident in the no-stall condition, although the aerodynamic center is preferably located slightly forward of the feathering axis 60 as described in my U.S. Patent No. 2,669,313. In the stall condition of FIG. 9, however, the blade tip produces a smaller lifting force $L_2$ and a larger drag force $D_2$ operating at a rearwardly shifted aerodynamic center. In addition, centrifugal force cause the deflection $\Delta$ of the feathering axis 60 and quarter chord 61 as described above. Both the downward deflection $\Delta$ and the rearward shift of the aerodynamic center cause a large forward moment $M_2$ as clearly seen in FIG. 9. Comparing the moment $M_1$ in FIG. 8 with the moment $M_2$ in FIG. 9 reveals that there will be a substantial change in the magnitude and direction of the moment which must be opposed by the control loads applied to the rotor blade 18 when the stall condition arises.

As the stall condition becomes more severe and spreads inboard over the rotor disc, the magnitudes of the deflection $\Delta$, the rearward shift, and drag forces increase causing a corresponding increase in the moment $M_2$ and the associated control load. The control load is consequently a good measure of the rotor performance.

Referring again to FIG. 3, it will be recognized that the blade 18 is shown at the 270° azimuth where blade stall normally occurs. The push rod 64a from this blade passes directly over the control point 82 for the servoactuator 80. A change in the magnitude of the vibratory control load at this servoactuator as the push rods 64 pass over the control point 82 becomes a logical parameter for measuring rotor performance. This is apparent when the load path from the retreating blade is traced through the pitch horn 62, push rod 64a and swash plate 66 to the control point 82 immediately above servoactuator 80. Experience has also indicated, however, that the other two servoactuators controlling swash plate 66 also experience an increase in the magnitude of the vibratory control loads when the retreating blades stall although the increase in magnitude is not usually as significant.

In order to use the control load as a performance parameter for unloading the rotor, it is necessary to detect this load. This can be done in a number of ways. In this particular embodiment, a load transducer is incorporated in the servoactuator 80. Reference to FIG. 5 shows a cutaway of this servoactuator 80 with a linear variable differential transformer (LVDT) installed within the hollow piston rod 90 of the servoactuator 80. The transformer is composed of a movable slug 92 on the end of a rod 94 and a set of coils 96. The rod 94 is fixedly held within the piston rod 90 by means of a cylindrical plug 98 press fitted within the piston rod 90 adjacent to the piston 100. The coils 96 are rigidly fastened to the end of the piston rod 90 adjacent to the connecting lug 102. When the rod 90 is strained, the slug 92 moves back and forth within the set of coils 96.

A detailed section of the slug 92 and coils 96 is seen in FIG. 6. A LVDT is a simple AC position transducer. The coils 96 are composed of a primary coil 104 and two secondary coils 106 and 108 connected in series opposed manner. An AC voltage source is used to excite the primary coil 104 and opposing voltages are generated in the secondary coils 106 and 108. The slug 92 composed of ferromagnetic material controls the magnetic coupling from the primary coil to each of the secondary coils. If the slug 92 is displaced from a centered position so that it is closer, for example, to coil 106, a greater portion of the magnetic flux from primary coil 104 will be coupled to coil 106 than to coil 108. With coils 108 and 106 connected in series opposed fashion, the output of the LVDT will equal the difference of the voltages induced into the secondary coils. This difference will be proportional to the displacement of the slug 92 with respect to the coils 96.

When control loads are applied to the servoactuator 80 from the blade 18, the piston rod 90 is strained. The LVDT will detect this strain through displacement of the slug 92 within the coils 96 and produce an electrical signal proportional to this strain. Since the strain in the piston rod 90 is directly proportional to the control loads to which the servoactuator is subjected, the electrical output of the LVDT is also proportional to the control loads.

Although a position transducer is shown for detecting the loads applied to the servoactuator, other transducers may also be used. A differential pressure transducer monitoring the pressure across the piston 100 of the servoactuator 80 could also supply the same information. It will also be noted that the control load sensing device need not be part of a servoactuator. A strain gauge mounted on either the stationary plate 70 or the rotating plate 68 would furnish information proportional to the control loads. Mounting a transducer anywhere on the rotating portion of the rotor system, however, would require some sort of commutator at the rotor and would not produce the same form of vibratory load as is experienced by the stationary portion of the control linkage.

As mentioned above, the magnitude of the vibratory load increases with the degree of stall on the retreating rotor blade. Actual tests have indicated that there is also a general increase in the steady state component of the control loads when a stall condition arises; however, the vibratory component is considered to be a more reliable parameter for measuring this condition.

Since the output of the LVDT is an AC voltage proportional to the servoactuator control loads which have both steady state and vibratory components, and since the vibratory control load is the parameter most suited to measuring the rotor performance, an electrical circuit is necessary which isolates the vibratory component of this AC signal. Referring to FIG. 7, one such circuit will be seen. The differential voltage output from the secondary coils 106 and 108 which represents the displacement of the slug 92 is fed to a detector 110. The detector is a conventional demodulator which will produce a signal representative of both the stead state and vibratory control loads. Since only the vibratory component is of interest, the signal is fed through a filter 112 which will remove the steady state component. To eliminate any noise accompanying the transducer signal, this filter 112 may be a band-pass filter having a center frequency equal to the blade frequency (defined above). The filtered vibratory signal is sent to a rectifier 114 which produces a DC signal proportional to the magnitude of the vibratory load. This DC signal is then fed through an amplifier 116 to drive the actuator 24 which positions the wings 20 through pivot arm 28 and torque tube 30. If a thrust-producing device were to be used to augment the rotor instead of the wing, the DC signal would control the thrust of the device. In the disclosed embodiment, the signal could also be used to control the thrust of the anti-torque rotor 36 in the pusher mode by means of an actuator and the special mixing linkage disclosed in U.S. application Ser. No. 563,821, Control Mechanism for Swivel Tail of an Aircraft, John A. Keder, Jr., filed July 8, 1966, now U.S. Patent No. 3,404,737, to which reference is hereby made. The DC signal, being a measure of the rotor performance, can also be displayed on a performance meter 118 in the cockpit 13.

Operation

Having described an embodiment of my invention, the operation of this rotor load proportioner will be readily understood. In low speed flight, the aircraft 10 will perform in the same manner as the conventional helicopter. When high speeds are desired, the anti-torque rotor 36 is swiveled into a pusher mode or the independent propulsive device, jet engine or propeller, is engaged for increased forward propulsion and the pilot increases forward speed by means of the rotor 16 as in the conventional helicopter. If the rotor acquires an excessively large portion of the aircraft load because of the high speed obtained, or because of a high-g maneuver, stall loads in the rotor blades 18 will be created. The stall loads being eccentric to the feathering axis 60 will cause an increase in the control loads transmitted through the pitch control horn 62, the push rod 64 and the swash plate 66. These control loads will cause an increase in the vibratory component of the control loads experienced by the servoactuator 80. The LVDT within the piston rod 90 of the servoactuator 80 will generate a signal proportional to the total control load, and the vibratory component of this load will be used to drive the actuator 24 through amplifier 116. The amplifier may cause the attitude of the wing 20 to increase in stepped increments each time the magnitude of the vibratory load exceeds a selected quantity. Alternatively, the change in pitch of the wing may be directly proportional to the increase in the magnitude of the vibratory control load above a selected level. The exact function by which any thrust-augmenting device is controlled through this amplifier 116 will depend upon the change in the augmenting force of the device caused by the motion of the actuator 24. It will be understood, however, that a large increase in the amplitude of the vibratory load will require a large increase in augmentation from the second device. As the magnitude of the vibratory load decreases, the augmentation of the second device should also decrease to permit the main rotor 16 to operate at its designed performance level.

It is to be understood that the invention is not limited to the specific embodiment herein illustrated and described but may be used in other ways without departure from its spirit. For instance, as mentioned above, rotor loading can be reduced by relieving either the horizontal or the vertical component of the main rotor thrust. The disclosed embodiment of the invention is directed to a wing that provides additional lift to relieve the large vertical component of thrust. It will be readily apparent that the smaller horizontal component of thrust could also be controlled by connecting the control load transducer to an auxiliary thrust producing device such as the pusher propeller 36. Optimum results may be achieved by coupling the load proportioner to both a wing and a push propeller in order to simultaneously reduce both the vertical and horizontal components of main rotor thrust.

I claim:
1. Apparatus for transferring the load of an aircraft between a rotor having lift-producing blades and a second lift-producing device comprising:
   (a) a sensor operatively associated with the rotor for producing a signal in response to the loads applied to the blades of the rotor in flight;
   (b) means for varying the lift characteristic of the second lift-producing device; and
   (c) an actuator operatively associated with the means for varying the lift characteristic of the device, the actuator being responsive to the signal of the sensor to vary the lift of the device as a function of the loads applied to the blades of the rotor.

2. Apparatus for proportioning aerodynamic lifting loads between a fixed wing and a rotary wing of an aircraft comprising:
   (a) a sensor for developing a signal in response to aerodynamic loads acting upon the rotary wing;
   (b) an actuator responsive to the signal from the sensor; and
   (c) means controlled by the actuator for varying the lift characteristic of the fixed wing in accordance with the aerodynamic loads acting upon the rotary wing.

3. Apparatus for proportioning the aerodynamic lifting load between a fixed wing and a rotary wing of a compound helicopter comprising:
   (a) a transducer generating a signal in response to loads imposed upon the rotary wing;
   (b) a control surface forming at least one portion of the fixed wing, the control surface being movable to vary the lift characteristic of the fixed wing; and
   (c) an actuator operatively connected with the control surface and responsive to the signal from the transducer to vary the lift characteristic of the fixed wing as a function of the signal from the transducer.

4. In a compound helicopter having a thrust-producing rotor with variable pitch blades:
   (a) first means for changing the pitch of the blades;
   (b) second means for augmenting the thrust of the rotor;
   (c) a sensor operatively connected with the first means to produce a signal proportional to the pitch control loads of the rotor blades;

(d) an actuator responsive to the signal produced by the sensor; and (e) third means operated by the actuator to control the second means whereby the thrust of the rotor is augmented as a function of pitch control loads of the rotor blades.

5. Apparatus for proportioning the lifting load of an aircraft between pitch controlled blades of a lifting rotor and a second lift-producing device comprising:

(a) a transducer for producing a signal in response to pitch control loads applied to the blades of the rotor in flight;

(b) means for varying the lift generated by the second lift-producing device; and (c) an actuator operatively associated with the means for varying the lift of the device, the actuator being responsive to the signal whereby the lift of the second lift-producing device is varied as a function of the pitch control loads applied to the blades in flight.

6. In a helicopter having a rotor with variable pitch blades for producing both vertical and horizontal thrust components:

(a) controllable thrust-producing means for augmenting at least one of the thrust components of the helicopter rotor;

(b) a control mechanism for cyclically and collectively varying the pitch of the rotor blades;

(c) a load transducer operatively connected to the control mechanism for sensing the loads applied by the blades to the control mechanism; and (d) actuator means for controlling the thrust-producing means in response to the load transducer whereby at least one component of the rotor thrust is augmented as a function of the loads in the control mechanism.

7. In a compound helicopter having a fuselage, a multibladed rotor and a wing extending laterally from the fuselage, an apparatus for proportioning the lifting forces between the rotor and wing comprising:

(a) pitch control means for varying the pitch of the rotor blades in order to change the rotor thrust;

(b) a load transducer operatively connected with the pitch control means for detecting control loads generated in the pitch control means by the rotor blades, the load transducer producing a signal proportional to the magnitude of the control loads; and (c) positioning means for moving at least one portion of the wing with respect to the fuselage to vary the lift produced by the wing in flight, the positioning means being responsive to the signal from the transducer to vary the lift of the wing in flight as a function of the magnitude of the control loads.

8. In a compound helicopter having a fuselage, a wing projecting laterally from the fuselage, a rotor with variable pitch blades, a swash plate mechanism connected to the blades for mechanically controlling the pitch of the blades, and a control linkage connected to the swash plate mechanism for defining the position of a swash plate with respect to the fuselage, the improvement comprising:

(a) a load sensor incorporated within the control linkage for detecting loads applied to the linkage through the swash plate by the retreating blades of the rotor, the sensor producing a signal in response to the loads in the control linkage;

(b) means for varying the angle of attack of the wing in forward flight; and (c) an actuator controlled by the signal from the sensor and connected with the means to vary the angle of attack of the wing as a function of the loads in the control linkage.

9. Apparatus according to claim 8 wherein:

(a) the sensor produces the signal having both a vibratory component and a steady state component proportional to corresponding components of the detected loads; and (b) discriminating means for receiving the signal and rejecting the steady state component are interposed between the sensor and the actuator, the discriminating means passing the vibratory component of the signal to the actuator.

10. Apparatus according to claim 9 wherein the discriminating means is a band-pass filter having a center frequency equal to the rotor blade frequency.

11. In a compound helicopter which includes a fuselage, a wing extending laterally from the fuselage and a lifting rotor with variable pitch blades, an apparatus for transferring the lifting loads between the wing and blades comprising:

(a) pitch control means for cyclically and collectively changing the pitch of the blades;

(b) a sensor operatively connected with the pitch control means for detecting stall on retreating blades of the rotor in forward flight, the sensor producing a signal representing the degree of stall on the retreating blades; and (c) movable means for varying the lift produced by the laterally extending wing in forward flight, the movable means being responsive to the signal from the sensor and causing an increase in the lift produced by the wing in response to an increase in the degree of stall.

12. In a compound helicopter having a wing, a fuselage, a rotor with blades mounted for pitch changing motion about feathering axes and pitch control means for varying the pitch of the blades, a rotor load proportioner comprising:

(a) a load transducer connected to the pitch control means for detecting aerodynamic and inertial loads in flight applied eccentrically to the feathering axes of retreating blades of the rotor, the transducer generating a signal proportional to the loads;

(b) a movable surface forming at least one portion of the wing for varying the lift characteristic of the wing; and (c) an actuator operatively connected to the surface and responsive to the signal from the transducer to move the surface as a function of the aerodynamic and inertial loads applied to the retreating blades of the rotor.

13. In a compound helicopter having a fuselage, a wing extending laterally from the fuselage, a lifting rotor with variable pitch blades, a pitch changing means connected to the blades, and a control mechanism operating upon the pitch changing means to establish blade pitch, the improvement which comprises:

(a) a signal-generating load sensor connected to the control mechanism for detecting retreating blade stall loads transmitted through the pitch changing means to the control mechanism;

(b) an actuator responsive to the load sensor signal; and (c) a movable control surface forming at least one portion of the wing and connected to the actuator to vary the lift produced by the wing in forward flight as a function of the retreating blade stall loads.

14. Apparatus for distributing the lifting loads in a compound helicopter having a fuselage, a rotor with variable pitch blades, an auxiliary propulsion means, and a wing projecting laterally from the fuselage for producing lift in forward flight comprising:

(a) control rods connected to each of the blades for varying the pitch of the blades;

(b) a swash plate coaxially mounted with the rotor, the swash plate having a first plate connected to each of the control rods and to the rotor for rotation with the blades and a second plate fixed against rotation with respect to the fuselage;

(c) servoactuators connected between the second plate and the fuselage for establishing the control plane of the swash plate;
(d) a load transducer operatively associated with one of the servoactuators for generating a signal as a function of the retreating blade control loads;
(e) a control surface forming at least one portion of the wing and being movable to change the lift of the wing in forward flight; and
(f) actuating means connecting to the control surface and responsive to the signal from the transducer to vary the lift of the wing as a function of the retreating blade control loads.

15. Apparatus according to claim 14 wherein:
(a) the transducer generates the signal proportional to both vibratory and steady state portions of the control loads; and
(b) the actuating means is responsive only to the magnitude of the vibratory portion of the control loads.

References Cited

UNITED STATES PATENTS 2,680,579 6/1954 Hohenemser _____ 244—17.13
3,385,537 5/1968 Lichten et al. _____ 244—6

FOREIGN PATENTS 1,373,277 8/1964 France.

MILTON BUCHLER, Primary Examiner
PAUL E. SAUBERER, Assistant Examiner

U.S. Cl. X.R.
244—6, 7